United States Patent
Xu et al.

(10) Patent No.: US 12,484,024 B2
(45) Date of Patent: Nov. 25, 2025

(54) UPLINK DATA TRANSMISSION METHOD AND APPARATUS, TERMINAL, AND STORAGE MEDIUM

(71) Applicant: GUANGDONG OPPO MOBILE TELECOMMUNICATIONS CORP., LTD., Guangdong (CN)

(72) Inventors: Jing Xu, Guangdong (CN); Yanan Lin, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 662 days.

(21) Appl. No.: 17/740,281

(22) Filed: May 9, 2022

(65) Prior Publication Data

US 2022/0272669 A1    Aug. 25, 2022

Related U.S. Application Data

(63) Continuation of application No. PCT/CN2019/116830, filed on Nov. 8, 2019.

(51) Int. Cl.
*H04W 72/02* (2009.01)
*H04L 1/1812* (2023.01)
(Continued)

(52) U.S. Cl.
CPC ........... *H04W 72/02* (2013.01); *H04L 1/1812* (2013.01); *H04L 5/0053* (2013.01);
(Continued)

(58) Field of Classification Search
CPC . H04W 72/02; H04W 72/0446; H04W 72/21; H04W 72/56; H04W 28/04;
(Continued)

(56) References Cited

U.S. PATENT DOCUMENTS 10,966,223 B2 *   3/2021   Kundu .............. H04W 72/0446
12,289,169 B2 *   4/2025   Yin ........................ H04L 5/0053
(Continued)

FOREIGN PATENT DOCUMENTS

CN   108521885   9/2018
CN   110034905   7/2019
(Continued)

OTHER PUBLICATIONS

"Search Report of of counterpart Europe application No. 24178550.0", issued on Sep. 12, 2024, p. 1-p. 9.
(Continued)

*Primary Examiner* — Oussama Roudani
(74) *Attorney, Agent, or Firm* — Hodgson Russ LLP

(57) ABSTRACT

The present application relates to the technical field of communications, and provides an uplink data transmission method and apparatus, a terminal, and a storage medium. The method comprises: if a first physical uplink control channel (PUCCH) and a second PUCCH to be transmitted overlap in a time domain, selecting a third PUCCH from a PUCCH set; transmitting first uplink information in wherein first PUCCH and second uplink information in wherein second PUCCH in the third PUCCH; and transmitting the first uplink information and the second uplink information to a network device by means of the third PUCCH. Both first uplink transmission data and second uplink transmission data are transmitted in the third PUCCH, so that the first uplink transmission data and the second uplink transmission data are subjected to multiplex transmission, thereby improving the reliability of data transmission, reducing time delay, and avoiding unnecessary retransmission.

15 Claims, 5 Drawing Sheets

(51) Int. Cl.
*H04L 5/00* (2006.01)
*H04W 72/0446* (2023.01)
*H04W 72/21* (2023.01)
*H04W 72/56* (2023.01)

(52) U.S. Cl.
CPC ....... *H04W 72/0446* (2013.01); *H04W 72/21* (2023.01); *H04W 72/56* (2023.01)

(58) Field of Classification Search
CPC ........... H04W 72/1268; H04W 72/563; H04W 72/569; H04L 1/1812; H04L 5/0053; H04L 1/1671; H04L 1/1854; H04L 1/1861; H04L 5/0055; H04L 5/006
See application file for complete search history.

(56) References Cited

U.S. PATENT DOCUMENTS

| | | | |
|---|---|---|---|
| 2014/0286296 | A1 | 9/2014 | Tiirola et al. |
| 2018/0062816 | A1 | 3/2018 | Papasakellariou et al. |
| 2018/0279291 | A1* | 9/2018 | Tiirola ................. H04L 25/0224 |
| 2019/0261361 | A1* | 8/2019 | Xiong ................... H04W 72/02 |
| 2019/0261391 | A1 | 8/2019 | Kundu et al. |
| 2019/0320431 | A1 | 10/2019 | Huang et al. |
| 2019/0327759 | A1 | 10/2019 | Lee et al. |
| 2020/0314900 | A1* | 10/2020 | Hosseini ............ H04W 74/0858 |
| 2022/0085956 | A1* | 3/2022 | Yin ............................ H04L 7/06 |
| 2023/0019892 | A1* | 1/2023 | Gordaychik ............ H04W 8/22 |
| 2024/0113814 | A1* | 4/2024 | Li ......................... H04L 1/1854 |

FOREIGN PATENT DOCUMENTS

| | | |
|---|---|---|
| CN | 110351045 | 10/2019 |
| CN | 110351057 | 10/2019 |
| EP | 3965344 | 3/2022 |
| EP | 3996312 | 5/2022 |
| EP | 4340507 | 3/2024 |
| WO | 2019147000 | 8/2019 |
| WO | 2019194660 | 10/2019 |

OTHER PUBLICATIONS

Wang, "LTE base station reception performance test analysis", Systems and solutions, with English translation thereof, Apr. 2011, pp. 47-53.

Office Action of China Counterpart Application No. 202210475934.5, with English translation thereof, issued on Jun. 22, 2023, pp. 1-14.

Office Action of European Counterpart Application No. 19951537.0, issued on Jul. 21, 2023, pp. 1-4.

"International Search Report (Form PCT/ISA/210) of PCT/CN2019/116830", mailed on Aug. 3, 2020, with English translation thereof, pp. 1-7.

"Written Opinion of the International Searching Authority (Form PCT/ISA/237) of PCT/CN2019/116830", mailed on Aug. 3, 2020, with English translation thereof, pp. 1-5.

Huawei, Hisilicon, "UL intra-UE multiplexing between control channels", 3GPP TSG RAN WG1 Meeting #97 R1-1907547, May 2019, pp. 1-4.

Qualcomm Incorporated, "UCI Enhancements for eURLLC ", 3GPP TSG-RAN WG1 #97 R1-190728, May 2019, pp. 1-13.

LG Electronics, "UCI enhancements for NR URLLC", 3GPP TSG RAN WG1 #96bis R1-1904628, Apr. 2019, pp. 1-6.

Oppo, "Summary#2 on UCI enhancements for URLLC ", 3GPP TSG RAN WG1 #97 R1-1907777, May 2019, pp. 1-20.

Sony , "UCI enhancements for eURLLC ", 3GPP TSG RAN WG1 #97 R1-1906841, May 2019, pp. 1-5.

Intel Corporation , "UCI enhancements for eURLLC ", 3GPP TSG RAN WG1 #98bis R1-1910661, Oct. 2019, pp. 1-15.

MCC Support , "Draft Report of 3GPP TSG RAN WG1 #98bis v0.1.0 ", 3GPP TSG RAN WG1 Meeting #99 R1-191xxxx, Nov. 2019, pp. 1-148.

Ericsson, "On UCI Multiplexing on PUCCH", 3GPP TSG RAN WG1 Meeting#92bis R1-1805183, Apr. 16-20, 2018, pp. 1-9.

"Search Report of of counterpart Europe application No. 19951537.0", issued on Oct. 20, 2022, p. 1-p. 8.

Office Action of China Counterpart Application No. 202210475934.5, with English translation thereof, issued on Sep. 14, 2023, pp. 1-12.

Office Action of Japan Counterpart Application No. 2022-526317, with English translation thereof, issued on Oct. 3, 2023, pp. 1-7.

Office Action of India Counterpart Application, Application No. 202227032707, issued on Feb. 21, 2023, pp. 1-7.

Huawei et al., "UCI enhancements for URLLC," 3GPP TSG RAN WG1 Meeting #97, R1-1906058, May 2019.

Huawei et al., "Intra-UE UCI multiplexing," 3GPP TSG RAN WG1 Meeting #95, R1-1813664, Nov. 2018.

Nokia et al., "New WID on enhanced Industrial Internet of Things (IoT) and URLLC support," 3GPP TSG RAN Meeting #86, RP-193233, Dec. 2019.

Ericsson, "Intra-UE Multiplexing/Prioritization Enhancements for IIoT/URLLC," 3GPP TSG-RAN WG1 Meeting #105-e, Tdoc R1-2104220, May 2021.

Zte, "Discussion on enhanced intra-UE multiplexing," 3GPP TSG RAN WG1 #106-e, R1-2106737, Aug. 2021.

Huawei et al., "Intra-UE multiplexing enhancements," 3GPP TSG RAN WG1 Meeting #106bis-e, R1-2108728, Oct. 2021.

Samsung, "Introduction of IIoT/URLLC enhancements in NR," 3GPP TSG RAN WG1 #107-e, R1-2112932, Nov. 2021.

KIPO, Office Action for KR Application No. 10-2022-7019175, Apr. 22, 2025.

* cited by examiner

UPLINK DATA TRANSMISSION METHOD AND APPARATUS, TERMINAL, AND STORAGE MEDIUM

CROSS-REFERENCE TO RELATED APPLICATION

This application is a continuation of international PCT application serial no. PCT/CN2019/116830, filed on Nov. 8, 2019. The entirety of the above—mentioned patent application is hereby incorporated by reference herein and made a part of this specification.

BACKGROUND

Technical Field

The present application relates to the technical field of communications, and in particular, relates to an uplink data transmission method and apparatus, a terminal, and a storage medium.

Description of Related Art

In the new radio (NR) communication system, the network device supports a hybrid automatic repeat reQuest (HARQ). That is, after the network device transmits data to the terminal, the terminal needs to send a HARQ feedback message (HARQ-ACK) to the network device. The HARQ-ACK feedback message may be an acknowledgment message (ACK) or a non-acknowledgment message (NACK). The network device then performs retransmission or transmits the next data according to the HARQ-ACK.

When the terminal sends the HARQ-ACK to the network device, the HARQ-ACK is generally encoded into a HARQ-ACK codebook, and the HARQ-ACK codebook is carried on the PUCCH resource and is transmitted to the network device. However, when the terminal transmits the PUCCH to the network device, two PUCCHs may overlap in the time domain. In the related art, when two PUCCHs overlap in the time domain, the PUCCH with the higher priority is selected, and the PUCCH with the higher priority is transmitted to the network device.

SUMMARY

The embodiments of the present application provide an uplink data transmission method and apparatus, a terminal, and a storage medium through which reliability of data transmission is improved, latency is reduced, and unnecessary retransmission is avoided. The technical solution is provided as follow.

In one aspect, an uplink data transmission method is provided, and the method includes the following steps.

If a first physical uplink control channel (PUCCH) and a second PUCCH to be transmitted overlap in a time domain, a third PUCCH is selected from a PUCCH set.

First uplink information in the first PUCCH and second uplink information in the second PUCCH are transmitted in the third PUCCH.

The first uplink information and the second uplink information are transmitted to a network device by means of the third PUCCH.

In an embodiment, the first uplink information is a first hybrid automatic repeat request feedback codebook (HARQ-ACK codebook), and the second uplink information is a second HARQ-ACK codebook.

The step of selecting the third PUCCH from the PUCCH set further includes the following step.

The third PUCCH is selected from a first PUCCH set, and the first PUCCH set is configured for uplink information with a highest or lowest priority between the first uplink information and the second uplink information.

Alternatively, the third PUCCH is selected from a second PUCCH set, and the second PUCCH set is configured for uplink information occupying a minimum or maximum PUCCH time domain resource, wherein the uplink information includes the first uplink information and the second uplink information; or Alternatively, the third PUCCH is selected from a third PUCCH set, and the third PUCCH set is configured for the network device for simultaneous transmission of a plurality of uplink information.

In another embodiment, the step of selecting the third PUCCH from the PUCCH set further includes the following step.

The third PUCCH is selected from the PUCCH set according to at least one of following information.

The following information includes instruction information of the network device and a sum of amount of data, and the sum of amount of data is a sum of an amount of data of the first uplink information and an amount of data of the second uplink information.

In another embodiment, the first uplink information is a first HARQ-ACK codebook, and the second uplink information is UCI other than HARQ-ACK. The HARQ-ACK at least includes first HARQ-ACK, and the first HARQ-ACK is HARQ-ACK encoded in the first HARQ-ACK codebook.

The step of selecting the third PUCCH from the PUCCH set further includes the following step.

The third PUCCH is selected from the PUCCH set configured for the first HARQ-ACK codebook.

Alternatively, the third PUCCH is selected from the PUCCH set configured for the UCI.

Alternatively, the third PUCCH is selected from the PUCCH set configured for the network device for simultaneous transmission of a plurality of uplink information.

In another embodiment, the step of transmitting the first uplink information and the second uplink information to the network device by means of the third PUCCH further includes the following step.

The first uplink information and the second uplink information are transmitted to the network device by means of the third PUCCH in a sub-slot where the first PUCCH is located, and the first HARQ-ACK codebook is transmitted in the sub-slot of the first PUCCH.

In another embodiment, before the step of transmitting the first uplink information in the first PUCCH and the second uplink information in the second PUCCH in the third PUCCH, the method further includes the following step.

If a priority of the first uplink information and a priority of the second uplink information are the same, the step of transmitting the first uplink information in the first PUCCH and the second uplink information in the second PUCCH in the third PUCCH is performed.

Alternatively, if the priority of the first uplink information and the priority of the second uplink information are different, the step of transmitting the first uplink information in the first PUCCH and the second uplink information in the second PUCCH in the third PUCCH is performed.

In another embodiment, before the step of transmitting the first uplink information in the first PUCCH and the second uplink information in the second PUCCH in the third PUCCH, the method further includes the following step.

If a distance between the first PUCCH and a downlink channel in the time domain satisfies a processing time requirement of a terminal and a distance between the second PUCCH and the downlink channel in the time domain satisfies a processing time requirement of the terminal, the step of transmitting the first uplink information in the first PUCCH and the second uplink information in the second PUCCH in the third PUCCH is performed.

In another embodiment, before the step of transmitting the first uplink information in the first PUCCH and the second uplink information in the second PUCCH in the third PUCCH, the method further includes the following step.

If a distance between the third PUCCH and a downlink channel in the time domain satisfies a processing time requirement of a terminal, the step of transmitting the first uplink information in the first PUCCH and the second uplink information in the second PUCCH in the third PUCCH is performed.

In another aspect, an uplink data transmission method is provided, and the method includes the following steps.

If a first physical uplink control channel (PUCCH) and a second PUCCH to be transmitted overlap in a time domain, one PUCCH is selected from the first PUCCH and the second PUCCH.

Uplink information in the selected PUCCH is transmitted to a network device by means of the selected PUCCH.

In an embodiment, the step of selecting one PUCCH from the first PUCCH and the second PUCCH further includes the following step.

One PUCCH with a later scheduling time is selected from the first PUCCH and the second PUCCH according to a scheduling time of the first PUCCH and a scheduling time of the second PUCCH.

Alternatively, according to a length of the first PUCCH in a time frequency and a length of the second PUCCH in the time frequency, one PUCCH with a shortest length is selected from the first PUCCH and the second PUCCH.

Alternatively, according to an ending time of the first PUCCH in the time domain and an ending time of the second PUCCH in the time domain, one PUCCH with an earlier ending time is selected from the first PUCCH and the second PUCCH.

Alternatively, according to a time frequency resource of the PUCCH occupied by first uplink information and a time frequency resource of the PUCCH occupied by second uplink information, a PUCCH where the uplink information occupying a minimum time frequency resource is located is selected from the first PUCCH and the second PUCCH.

In another aspect, the present application further provides an uplink data transmission apparatus, and the apparatus includes a first selection module, a transmitting module, and a first transmission module.

The first selection module is configured for selecting a third physical uplink control channel (PUCCH) from a PUCCH set if a first PUCCH and a second PUCCH to be transmitted overlap in a time domain.

The transmitting module is configured for transmitting first uplink information in the first PUCCH and second uplink information in the second PUCCH in the third PUCCH.

The first transmission module is configured for transmitting the first uplink information and the second uplink information to a network device by means of the third PUCCH.

In another embodiment, the first uplink information is a first hybrid automatic repeat request feedback codebook (HARQ-ACK codebook), and the second uplink information is a second HARQ-ACK codebook.

The first selection module is further configured for selecting the third PUCCH from a first PUCCH set, and the first PUCCH set is configured for uplink information with a highest or lowest priority between the first uplink information and the second uplink information.

Alternatively, the first selection module is further configured for selecting the third PUCCH from a second PUCCH set, and the second PUCCH set is configured for uplink information occupying a minimum or maximum PUCCH time domain resource, wherein the uplink information includes the first uplink information and the second uplink information.

Alternatively, the first selection module is further configured for selecting the third PUCCH from a third PUCCH set, and the third PUCCH set is configured for the network device for simultaneous transmission of a plurality of uplink information.

In another embodiment, the first selection module may select the third PUCCH from the PUCCH set according to at least one of following information.

Herein, the following information includes instruction information of the network device and a sum of amount of data, and the sum of amount of data is a sum of an amount of data of the first uplink information and an amount of data of the second uplink information.

In another embodiment, the first uplink information is a first HARQ-ACK codebook, and the second uplink information is UCI other than HARQ-ACK. The HARQ-ACK at least includes first HARQ-ACK, and the first HARQ-ACK is HARQ-ACK encoded in the first HARQ-ACK codebook.

The first selection module is further configured for selecting the third PUCCH from the PUCCH set configured for the first HARQ-ACK codebook.

Alternatively, the first selection module is further configured for selecting the third PUCCH from the PUCCH set configured for the UCI.

Alternatively, the first selection module is further configured for selecting the third PUCCH from the PUCCH set configured for the network device for simultaneous transmission of a plurality of uplink information.

In another embodiment, The first transmission module is further configured for transmitting the first uplink information and the second uplink information to the network device by means of the third PUCCH in a sub-slot where the first PUCCH is located, and the first HARQ-ACK codebook is transmitted in the sub-slot of the first PUCCH.

In another embodiment, The transmitting module is further configured for transmitting the first uplink information in the first PUCCH and the second uplink information in the second PUCCH in the third PUCCH if a priority of the first uplink information and a priority of the second uplink information are the same.

Alternatively, the transmitting module is further configured for transmitting the first uplink information in the first PUCCH and the second uplink information in the second PUCCH in the third PUCCH if the priority of the first uplink information and the priority of the second uplink information are different.

In another embodiment, the transmitting module is further configured for transmitting the first uplink information in the first PUCCH and the second uplink information in the second PUCCH in the third PUCCH if a distance between the first PUCCH and a downlink channel in the time domain satisfies a processing time requirement of a terminal and a distance between the second PUCCH and the downlink channel in the time domain satisfies a processing time requirement of the terminal.

In another embodiment, the transmitting module is further configured for transmitting the first uplink information in the first PUCCH and the second uplink information in the second PUCCH in the third PUCCH if a distance between the third PUCCH and a downlink channel in the time domain satisfies a processing time requirement of a terminal.

In another aspect, the present application further provides an uplink data transmission apparatus, and the apparatus further includes a second selection module and a second transmission module.

The second selection module is configured for selecting one PUCCH from a first PUCCH and a second PUCCH if the first PUCCH and the second PUCCH to be transmitted overlap in a time domain.

The second transmission module is configured for transmitting uplink information in the selected PUCCH to a network device by means of the selected PUCCH.

In an embodiment, the second selection module is further configured for selecting one PUCCH with a later scheduling time from the first PUCCH and the second PUCCH according to a scheduling time of the first PUCCH and a scheduling time of the second PUCCH.

Alternatively, the second selection module is further configured for selecting one PUCCH with a shortest length from the first PUCCH and the second PUCCH according to a length of the first PUCCH in a time frequency and a length of the second PUCCH in the time frequency.

Alternatively, the second selection module is further configured for selecting one PUCCH with an earlier ending time from the first PUCCH and the second PUCCH according to an ending time of the first PUCCH in the time domain and an ending time of the second PUCCH in the time domain.

Alternatively, the second selection module is further configured for selecting a PUCCH where the uplink information occupying a minimum time frequency resource is located from the first PUCCH and the second PUCCH according to a time frequency resource of the PUCCH occupied by first uplink information and a time frequency resource of the PUCCH occupied by second uplink information.

In another aspect, the present application further provides a terminal device, and the terminal device includes a processor and a memory. The memory stores at least one instruction, and the at least one instruction is configured to be executed by the processor to implement the uplink data transmission method according to any one of the foregoing embodiments of one aspect.

In another aspect, the present application further provides a terminal device, and the terminal device includes a processor and a memory. The memory stores at least one instruction, and the at least one instruction is configured to be executed by the processor to implement the uplink data transmission method according to any one of the foregoing embodiments of another aspect.

In another aspect, the present application further provides a computer readable storage medium, and the computer readable storage medium stores at least one instruction. The at least one instruction is configured to be executed by the processor to implement the uplink data transmission method according to any one of the foregoing embodiments of one aspect.

In another aspect, the present application further provides a computer readable storage medium, and the computer readable storage medium stores at least one instruction. The at least one instruction is configured to be executed by the processor to implement the uplink data transmission method according to any one of the foregoing embodiments of another aspect.

In another aspect, the present application further provides a chip, and the chip includes a programmable logic circuit and/or a program instruction When the chip runs, the chip is configured to implement the uplink data transmission method according to any one of the foregoing embodiments of one aspect.

In another aspect, the present application further provides a chip, and the chip includes a programmable logic circuit and/or a program instruction. When the chip runs, the chip is configured to implement the uplink data transmission method according to any one of the foregoing embodiments of another aspect.

The present application further provides a computer program product, and the computer program product includes one or a plurality of computer programs. When being executed by a processor, the computer program is configured to implement the uplink data transmission method according to any one of the foregoing embodiments of one aspect.

The present application further provides a computer program product, and the computer program product includes one or a plurality of computer programs. When being executed by a processor, the computer program is configured to implement the uplink data transmission method according to any one of the foregoing embodiments of another aspect.

The technical solution provided by the embodiments of the present application at least includes the following beneficial effects.

In the embodiments of the present application, if the first PUCCH and the second PUCCH overlap in the time domain, the third PUCCH is selected from the PUCCH set, the first uplink transmission data and the second uplink transmission data are transmitted in the third PUCCH, and the first uplink information and the second uplink information are transmitted to the network device by means of the third PUCCH. Since both the first uplink transmission data and second uplink transmission data are transmitted in the third PUCCH, the uplink transmission data and the second uplink transmission data are subjected to multiplex transmission, and reliability of data transmission is thereby improved, latency is reduced, and unnecessary retransmission is avoided.

BRIEF DESCRIPTION OF THE DRAWINGS

To make the technical solutions provided in the embodiments of the present application more clearly illustrated, several accompanying drawings required by the embodiments for description are briefly introduced as follows. Obviously, the drawings in the following description are merely some embodiments of the present application, and for a person having ordinary skill in the art, other drawings can be obtained based on these drawings without inventive effort.

DESCRIPTION OF THE EMBODIMENTS

To better illustrate the goal, technical solutions, and advantages of the present application, the accompanying drawings are included to provide a detailed description of the embodiments of the present application.

Figure 1:
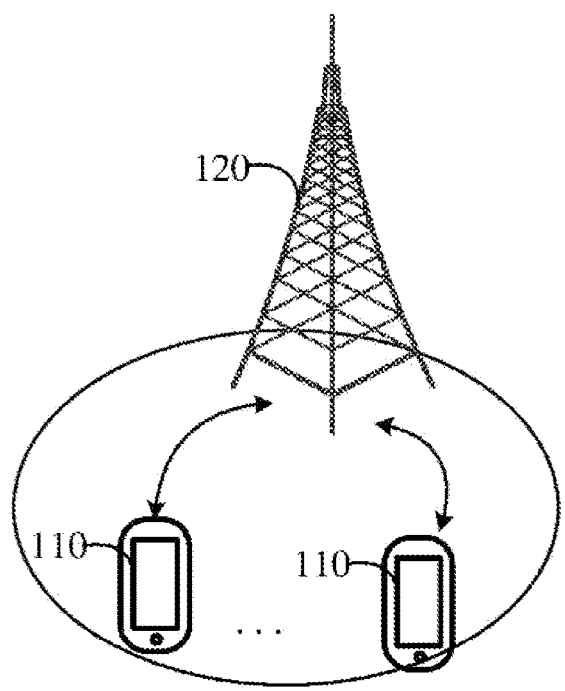
FIG. 1 is a schematic diagram of an implementation environment provided by an exemplary embodiment of the present application.

FIG. 1 is a schematic diagram of an implementation environment according to an exemplary embodiment. The implementation environment mainly includes a terminal 110 and a network device 120. The terminal 110 may perform wireless communication with the network device 120 wirelessly, and the terminal 110 may transmit uplink data to the network device 120 according to a method provided in the embodiments of the present application. In some embodiments, the terminal 110 may also be referred to as user equipment. The network device 120 may be a base station, for example, a 4$^{th}$ generation mobile communication technology (4G) base station, a 5G (5$^{th}$-generation Node B, gNB) base station, or a network device in a future communication network, which is not limited in the embodiments of the present application.

In the embodiments of the present application, when a first physical uplink control channel (PUCCH) and a second PUCCH to be transmitted overlap in a time domain, multiplexing may be performed. Herein, the first PUCCH transmits first uplink information, and the second PUCCH transmits second uplink information. The first uplink information may include at least one of uplink control information and uplink data. Similarly, the second uplink information may also include at least one of the uplink control information and the uplink data.

In the embodiments of the present application, the first uplink information may be a first HARQ-ACK codebook, and the second uplink information may be a second HARQ-ACK codebook. Herein, the first HARQ-ACK codebook may be a HARQ-ACK codebook encapsulating one HARQ-ACK or may be a HARQ-ACK codebook encapsulating a plurality of HARQ-ACKs. The second HARQ-ACK codebook may also be a HARQ-ACK codebook encapsulating one HARQ-ACK or may be a HARQ-ACK codebook encapsulating a plurality of HARQ-ACKs.

The first uplink information may be a first HARQ-ACK codebook, and the second uplink information may be uplink control information (UCI) other than HARQ-ACK. Herein, the second uplink information being the UCI other than the HARQ-ACK means that the encapsulated information is not the HARQ-ACK. That is, the HARQ-ACK at least includes first HARQ-ACK, and the first HARQ-ACK is HARQ-ACK encoded in the first HARQ-ACK codebook. For instance, the second uplink information is a scheduling request (SR) or a channel state information reference signal (CSI-RS).

When the first uplink information is the first HARQ-ACK codebook, the second uplink information is the second HARQ-ACK codebook, and the network device 120 sends downlink data to the terminal 110, the terminal 110 feeds back the HARQ-ACK of the downlink data to the network device 120. The HARQ-ACK may be ACK and may also be NACK. Further, when the terminal 110 sends the HARQ-ACK to the network device 120, the HARQ-ACK is generally encoded into a HARQ-ACK codebook, and the HARQ-ACK codebook is transmitted in a PUCCH resource and is transmitted to the network device 120. Further, the terminal 110 may encode one HARQ-ACK in a same slot into one HARQ-ACK codebook and may also encode at least two HARQ-ACKs in the same slot into one HARQ-ACK codebook. The terminal 110 may further encode one HARQ-ACK in a same sub-slot into one HARQ-ACK codebook and may also encode at least two HARQ-ACKs in the same sub-slot into one HARQ-ACK codebook.

Figure 2:
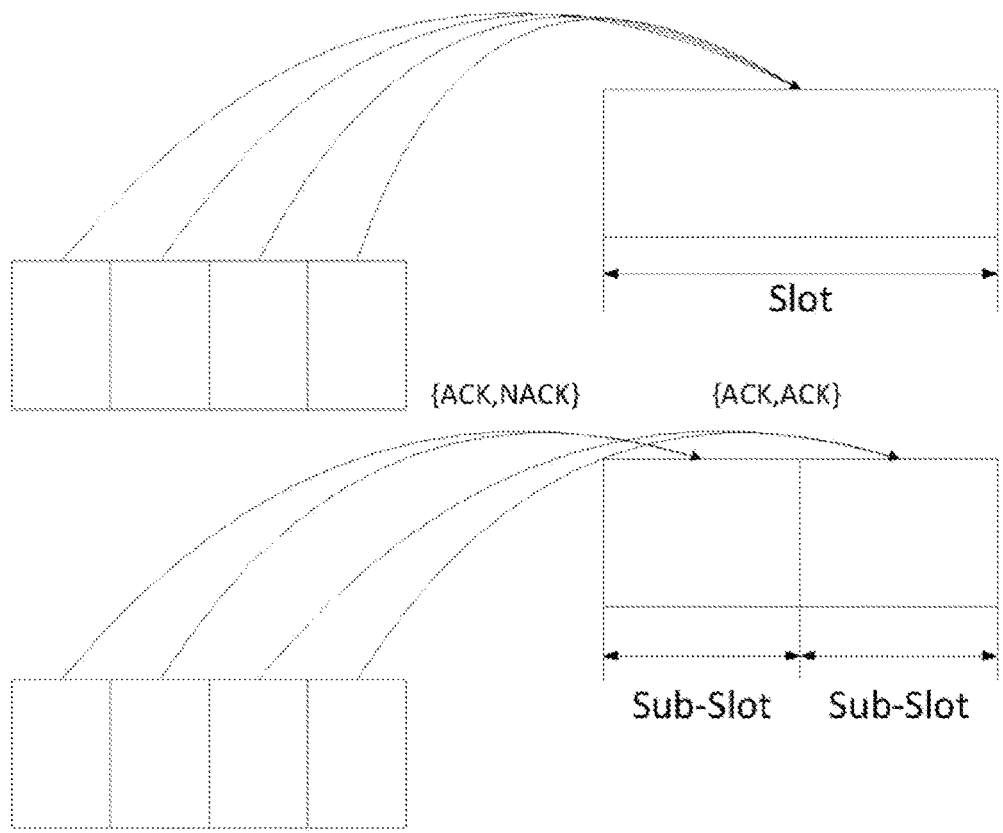
FIG. 2 is a schematic diagram of two types of HARQ-ACK codebooks provided by an exemplary embodiment of the present application.

With reference to FIG. 2, in Rel-16 of NR, the terminal 110 supports two types of HARQ-ACK codebooks, namely, a slot-level ARQ-ACK codebook and a sub-slot-level ARQ-ACK codebook. Regarding the slot-level ARQ-ACK codebook, the terminal 110 may carry the HARQ-ACK in one slot or multiplex at least two HARQ-ACKs in one slot, and the slot belongs to the time domain resource of the PUCCH. Regarding the sub-slot-level ARQ-ACK codebook, the terminal 110 may carry the HARQ-ACK in one sub-slot or multiplex at least two HARQ-ACKs in one sub-slot, and the sub-slot belongs to the time domain resource of the PUCCH.

Note that one slot includes two sub-slots. In FIG. 2, 4 HARQ-ACKs are multiplexed into one slot and 2 HARQ-ACKs are multiplexed into one sub-slot as an example for illustration.

In the embodiments of the present application, the terminal 110 encodes one or at least two first HARQ-ACKs into a first HARQ-ACK codebook and transmits the first HARQ-ACK codebook in the first PUCCH. When the terminal 110 has not sent the first PUCCH to the network device 120, the terminal 110 generates one or at least two second HARQ-ACKs again, encodes one or at least two second HARQ-ACKs into the second HARQ-ACK codebook, and transmits the second HARQ-ACK codebook in the second PUCCH. In addition, the first PUCCH and the second PUCCH overlap in the time domain.

In an embodiment, multiplex transmission may be performed on the first HARQ-ACK codebook and the second HARQ-ACK codebook by the terminal 110. That is, the first HARQ-ACK codebook and the second HARQ-ACK codebook are multiplexed in a third PUCCH, and the first HARQ-ACK codebook and the second HARQ-ACK codebook are transmitted to the network device 120 by means of the third PUCCH.

In another embodiment, the terminal 110 may select a PUCCH from the first PUCCU and the second PUCCH and transmits uplink information carried thereon to the network device 120 through the selected PUCCH. For instance, when the selected PUCCH is the first PUCCH, the terminal 110 transmits the first HARQ-ACK codebook to the network device 120 by means of the first PUCCH. When the selected PUCCH is the second PUCCH, the terminal 110 transmits the second HARQ-ACK codebook to the network device 120 by means of the second PUCCH.

In the embodiments of the present application, another scenario is provided, the terminal 110 encodes one or a plurality of first HARQ-ACKs into a first HARQ-ACK codebook and transmits the first HARQ-ACK codebook in the first PUCCH. When the terminal 110 has not sent the first PUCCH to the network device 130, the terminal 110 needs to send the UCI other than the HARQ-ACK to the network device 130 and transmits the UCI in the second PUCCH. In addition, the first PUCCH and the second PUCCH overlap in the time domain. Multiplex transmission may be performed on the first HARQ-ACK codebook and the UCI by the terminal 110. That is, the first HARQ-ACK codebook and the UCI are multiplexed in the third PUCCH, and the first HARQ-ACK codebook and the UCI are transmitted to the network device 130 by means of the third PUCCH.

The processing procedures of these three scenarios are described in detail in the following three embodiments provided as follows.

Figure 3:
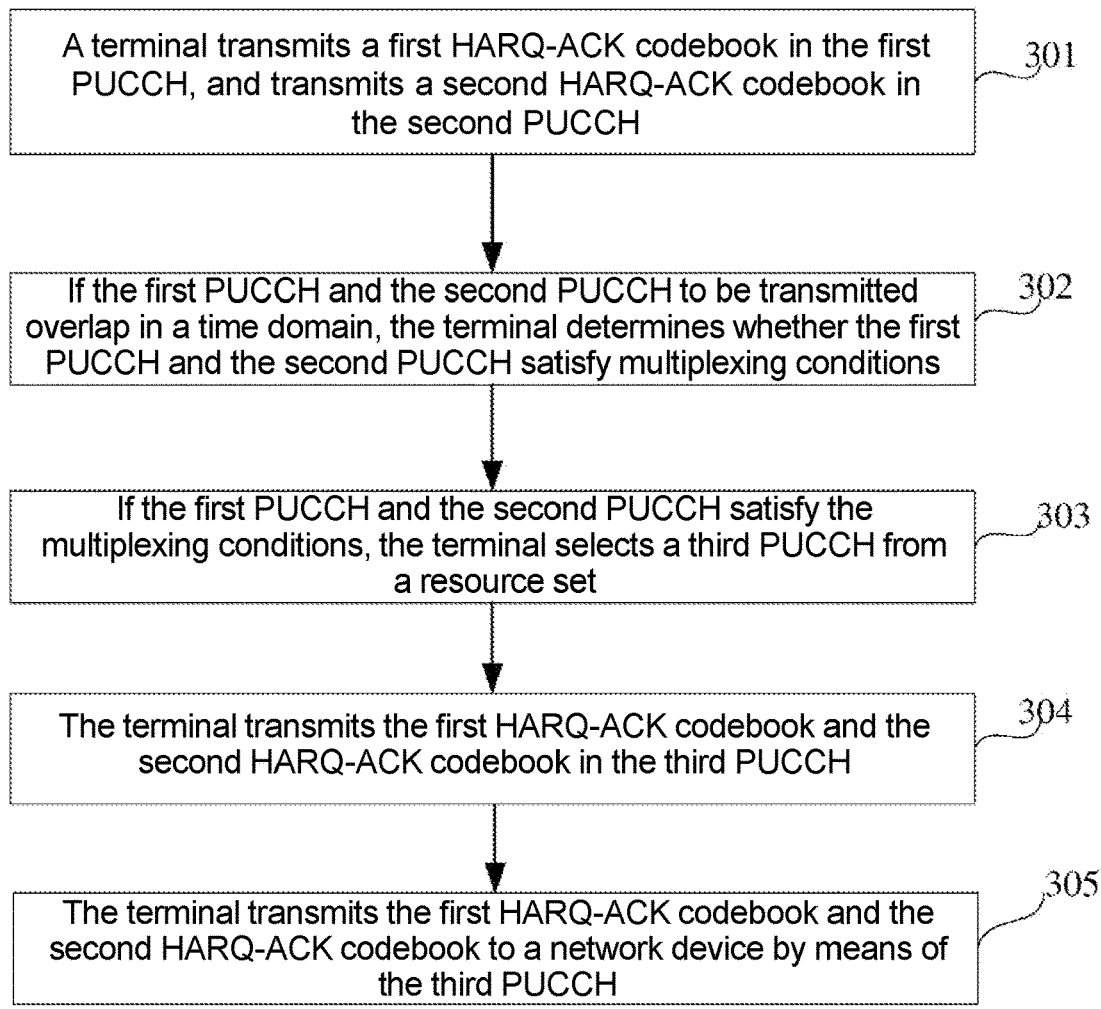
FIG. 3 is a flow chart of an uplink data transmission method provided by an exemplary embodiment of the present application.

FIG. 3 is a flow chart of an uplink data transmission method according to an exemplary embodiment of the present application. This method may be applied in the abovementioned implementation environment. In the embodiments of the present application, the first uplink information is the first HARQ-ACK codebook, and the second uplink information is the second HARQ-ACK codebook. In addition, multiplex transmission performed on the first HARQ-ACK codebook and the second HARQ-ACK codebook is described as an example. The method may include the following steps so as to be implemented.

In step 301, a terminal transmits a first HARQ-ACK codebook in a first PUCCH and transmits a second HARQ-ACK codebook in a second PUCCH.

Figure 4:
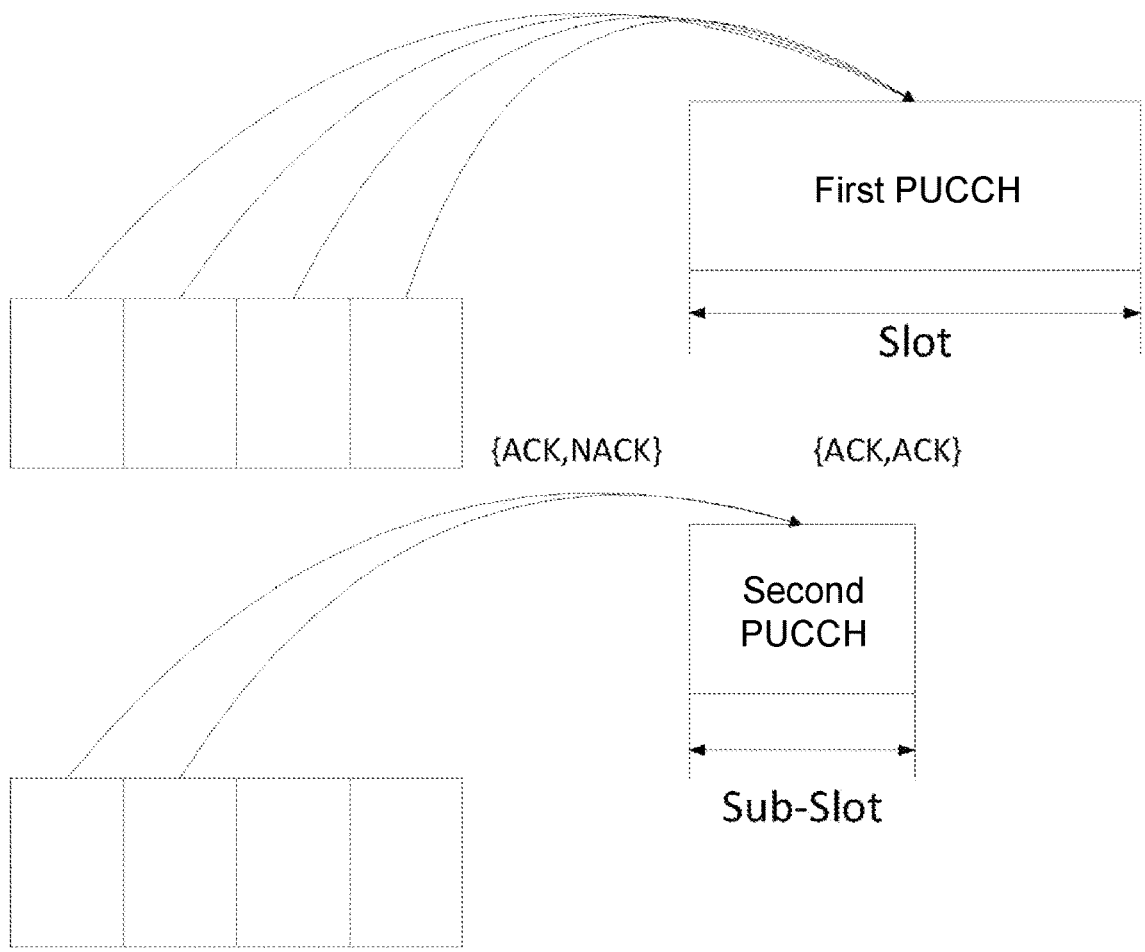
FIG. 4 is a schematic diagram of two PUCCHs provided by an exemplary embodiment of the present application.

The first HARQ-ACK codebook may be a slot HARQ-ACK codebook or a sub-slot HARQ-ACK codebook. The second HARQ-ACK codebook may be a slot HARQ-ACK codebook or a sub-HARQ-ACK codebook. With reference to FIG. 4, the first HARQ-ACK codebook being a slot HARQ-ACK codebook and the second HARQ-ACK codebook being a sub-slot HARQ-ACK codebook are treated as an example for description in FIG. 4.

This step may be implemented through steps (1) to (6) including the following.

(1) A network device transmits first downlink information to a terminal by means of a first downlink channel.

(2) The terminal generates first HARQ-ACK according to receipt of the first downlink information.

The first HARQ-ACK may be an ACK message or a NACK message. In the case that the terminal successfully receives the first downlink information, the terminal returns the ACK message to the network device, and in the case that the terminal does not successfully receive the first downlink information, the terminal returns the NACK message to the network device.

(3) The terminal encodes the first HARQ-ACK into a first HARQ-ACK codebook and transmits the first HARQ-ACK codebook in a first PUCCH.

Note that the terminal may encode the first HARQ-ACK into the first HARQ-ACK codebook and may also simultaneously encode the first HARQ-ACK and other HARQ-ACKs in a time slot where the first HARQ-ACK is located into the first HARQ-ACK codebook.

The first HARQ-ACK codebook may be a slot HARQ-ACK codebook or a sub-slot HARQ-ACK codebook. In an embodiment, the terminal may encode the first HARQ-ACK into a slot HARQ-ACK codebook or a sub-slot HARQ-ACK codebook according to its own configuration. For instance, when the HARP-ACK encoding format configured by the terminal is the slot HARQ-ACK codebook, the terminal encodes the first HARQ-ACK into the first slot HARQ-ACK codebook, and when the HARP-ACK encoding format configured by the terminal is the sub-slot HARQ-ACK codebook, the terminal encodes the first HARQ-ACK into the first sub-slot HARQ-ACK codebook.

In another embodiment, the network device may instruct the HARQ-ACK coding format of the terminal, and correspondingly, the terminal encodes the first HARQ-ACK into the coding format instructed by the network device. For instance, when the HARQ-ACK encoding format instructed by the network device is the slot HARQ-ACK codebook, the terminal encodes the first HARQ-ACK into the first slot HARQ-ACK codebook, and when the HARP-ACK encoding format instructed by the network device is the sub-slot HARQ-ACK codebook, the terminal encodes the first HARQ-ACK into the first sub-slot HARQ-ACK codebook.

Note that the network device configures a seventh PUCCH set for transmitting the HARQ-ACK for the terminal. Therefore, after encoding the first HARQ-ACK into the first HARQ-ACK codebook, the terminal may select the first PUCCH from the seventh PUCCH set.

In an embodiment, the terminal selects the first PUCCH according to an amount of data of the first HARQ-ACK codebook. Correspondingly, the step of selecting, by the terminal, the first PUCCH from the seventh PUCCH set may be: the terminal selects the first PUCCH that is not less than the amount of data of the first HARQ-ACK codebook from the seventh PUCCH set. In another embodiment, the network device instructs the terminal to select the first PUCCH. Correspondingly, the step of selecting, by the terminal, the first PUCCH from the seventh PUCCH set may be: The terminal selects the first PUCCH from a sixth PUCCH set according to first instruction information of the network device and/or an amount of data of the first uplink information.

The first instruction information may be a first downlink control information (DCI). Correspondingly, the terminal selects the first PUCCH instructed by the first DCI from the seventh PUCCH set, and the first instruction information may also be a control channel element (CEE) index. Correspondingly, the terminal selects the first PUCCH instructed by the CCE index from the seventh PUCCH set.

(4) The network device transmits second downlink data to the terminal by means of a second downlink channel.

(5) The terminal generates second HARQ-ACK according to receipt of the second downlink data.

Similarly, the second HARQ-ACK may be an ACK message or a NACK message. In the case that the terminal successfully receives the second downlink data, the terminal returns the ACK message to the network device, and in the case that the terminal does not successfully receive the second downlink data, the terminal returns the NACK message to the network device.

(6) The terminal encodes the second HARQ-ACK into a second HARQ-ACK codebook and transmits the second HARQ-ACK codebook in a second PUCCH.

This step is similar to step (3), and description thereof is thus not repeated herein.

Note that there is no strict time sequence between steps (1) to (3) and steps (4) to (6). Steps (1) to (3) may be performed first, followed by steps (4) to (6), or steps (4) to (6) may be performed first, followed by steps (1) to (3).

Note that after obtaining the first HARQ-ACK codebook and the second HARQ-ACK codebook, the terminal may also determine a priority of the first HARQ-ACK codebook and a priority of the second HARQ-ACK codebook. Herein, determination of the priority of the first HARQ-ACK codebook and the priority of the second HARQ-ACK codebook may be made in any of the following four manners:

Regarding the first implementation manner, the terminal determines the priority of the first HARQ-ACK codebook (or the second HARQ-ACK codebook) according to a DCI format adopted by scheduling signaling of the first HARQ-ACK codebook (or the second HARQ-ACK codebook).

For instance, if the DCI format adopted by the scheduling signaling of the first HARQ-ACK codebook (or the second HARQ-ACK codebook) is 0_0/0_1/1_1/1_0, the terminal determines that a priority level of the first HARQ-ACK codebook (or the second HARQ-ACK codebook) is a low priority level, that is, the first HARQ-ACK codebook (or the second HARQ-ACK codebook) is enhanced mobile broadband (EMBB) data. If the DCI format adopted by the scheduling signaling of the first HARQ-ACK codebook (or the second HARQ-ACK codebook) is 0_2/1_2, the terminal determines that the priority level of the first HARQ-ACK codebook (or the second HARQ-ACK codebook) is a high priority level, that is, the first HARQ-ACK codebook (or the second HARQ-ACK codebook) is ultra-reliable and low latency communications (URLLC) data.

Regarding the second implementation manner, the terminal distinguishes the priority level according to a scrambling code of a DCI cyclic redundancy check (CRC) of the first HARQ-ACK codebook (or the second HARQ-ACK codebook).

For instance, if the DCI CRC of the first HARQ-ACK codebook (or the second HARQ-ACK codebook) is scrambled by means of C-RNTI, the terminal determines that the priority level of the first HARQ-ACK codebook (or the second HARQ-ACK codebook) is a low priority level, that is, the first HARQ-ACK codebook (or the second HARQ-ACK codebook) is EMBB data. If the DCI CRC of the first HARQ-ACK codebook (or the second HARQ-ACK codebook) is scrambled by means of MCS-C-RNTI, the terminal determines that the priority level of the first HARQ-ACK codebook (or the second HARQ-ACK codebook) is a high priority level, that is, the first HARQ-ACK codebook (or the second HARQ-ACK codebook) is URLLC data.

Regarding the third implementation manner, the terminal determines the priority of the first HARQ-ACK codebook (or the second HARQ-ACK codebook) according to a domain added in a DCI payload of the first HARQ-ACK codebook (or the second HARQ-ACK codebook).

For instance, 1 bit is added to the DCI payload of the first HARQ-ACK codebook (or the second HARQ-ACK codebook), and if the bit is 0, the terminal determines that the priority level of the first HARQ-ACK codebook (or the second HARQ-ACK codebook) is a low priority level, that is, the first HARQ-ACK codebook (or the second HARQ-ACK codebook) is EMBB data. If the bit is 1, the terminal determines that the priority level of the first HARQ-ACK codebook (or the second HARQ-ACK codebook) is a high priority level, that is, the first HARQ-ACK codebook (or the second HARQ-ACK codebook) is URLLC data.

Regarding the fourth implementation manner, the terminal determines the priority level of the first HARQ-ACK codebook (or the second HARQ-ACK codebook) according to a CORESET/search space of the first HARQ-ACK codebook (or the second HARQ-ACK codebook) by means of a CORESET/Searchspace where the detected DCI is located.

For instance, if DCI is detected by the DCI of the first HARQ-ACK codebook (or the second HARQ-ACK codebook) in a CORESET1/Searchspace1 (region corresponding to the low priority level) region, the terminal determines that the priority level of the first HARQ-ACK codebook (or the second HARQ-ACK codebook) is a low priority level, that is, the first HARQ-ACK codebook (or the second HARQ-ACK codebook) is EMBB data. If DCI is detected by the DCI of the first HARQ-ACK codebook (or the second HARQ-ACK codebook) in a CORESET1/Searchspace2 (region corresponding to the high priority level) region, the terminal determines that the priority level of the first HARQ-ACK codebook (or the second HARQ-ACK codebook) is a high priority level, that is, the first HARQ-ACK codebook (or the second HARQ-ACK codebook) is URLLC.

In step 302, if the first PUCCH and the second PUCCH to be transmitted overlap in the time domain, the terminal determines whether the first PUCCH and the second PUCCH satisfy multiplexing conditions.

The multiplexing conditions include a first multiplexing condition and a second multiplexing condition. The first multiplexing condition at least includes the priority of the first HARQ-ACK codebook and the priority of the second HARQ-ACK codebook being the same. The first multiplexing condition may further include the first PUCCH and the second PUCCH satisfying a first time sequence condition. The first time sequence condition is that a distance between the first PUCCH and the first downlink channel in the time domain satisfies a processing time requirement of the terminal, and a distance between the second PUCCH and the second downlink channel in the time domain satisfies the processing time requirement of the terminal. Alternatively, the first time sequence condition is that a distance between multiplexed third PUCCH and the first downlink channel (or the second downlink channel) satisfies the processing time requirement of the terminal.

The second multiplexing condition at least includes the priority of the first HARP-ACK codebook and the priority of the second HARQ-ACK codebook being different. The second multiplexing condition may further include the first PUCCH and the second PUCCH satisfying a second time sequence condition. The second time sequence condition is that a distance between the first PUCCH and the first downlink channel in the time domain satisfies the processing time requirement of the terminal, and a distance between the second PUCCH and the second downlink channel in the time domain satisfies the processing time requirement of the terminal. Alternatively, the first time sequence condition is that a distance between multiplexed third PUCCH and the first downlink channel (or the second downlink channel) satisfies the processing time requirement of the terminal.

In the embodiments of the present application, subsequent multiplexing is performed only when the first PUCCH and the second PUCCH satisfy the first time sequence condition or the second time sequence condition. As such, the PUCCHs that satisfy the processing time requirement of the terminal are multiplexed, and the PUCCHs that do not satisfy the processing time requirement of the terminal are not multiplexed. In this way, resources are saved, resource utilization is increased, reliability of data transmission is improved, latency is decreased, and unnecessary retransmission is avoided.

In the embodiments of the present application, when the first PUCCH and the second PUCCH satisfy the first multiplexing condition, subsequent multiplexing is performed only when the priority of the first HARQ-ACK codebook and the priority of the second HARQ-ACK codebook are the same. The two HARQ-ACK codebooks with the same priority level may thereby be multiplexed, so that the HARQ-ACK codebooks with the same priority level may be transmitted at the same time, and the latency is reduced.

In the embodiments of the present application, when the first PUCCH and the second PUCCH satisfy the second multiplexing condition, subsequent multiplexing is performed only when the priority of the first HARQ-ACK codebook and the priority of the second HARQ-ACK codebook are different. Therefore, when the priority levels are different, multiplex transmission may still be performed, and the development of communication technology is thus satisfied.

Note that if the first PUCCH and the second PUCCH satisfy the multiplexing conditions, step 303 is performed, and if the first PUCCH and the second PUCCH do not satisfy the multiplexing conditions, one PUCCH is selected from the first PUCCH and the second PUCCH, and the selected PUCCH is transmitted to the network device.

In step 303, if the first PUCCH and the second PUCCH satisfy the multiplexing conditions, the terminal selects the third PUCCH from the PUCCH set.

The terminal may select the third PUCCH from the PUCCH set according to at least one of following information. Herein, the following information includes second instruction information of the network device and a sum of amount of data, and the sum of amount of data is a sum of an amount of data of the first HARQ-ACK codebook and an amount of data of the second HARQ-ACK codebook. Correspondingly, in this step, the terminal may select the third PUCCH instructed by the second instruction information from the PUCCH set according to the second instruction information of the network device.

Alternatively, the terminal determines the sum of amount of data of the first HARQ-ACK codebook and the second HARQ-ACK codebook and selects the third PUCCH carrying the amount of data not less than the sum of amount of data from the PUCCH set according to the sum of amount of data.

Alternatively, the terminal, according to the second instruction information of the network device and a sum of numbers of the first HARQ-ACK codebook and the second HARQ-ACK codebook, selects the third PUCCH instructed by the second instruction information and carrying the amount of data not less than the sum of numbers.

Herein, the second instruction information may be a second DCI message or a CCE index. The third PUCCH may be different from the first PUCCH and the second PUCCH, and may also be the same as the first PUCCH or the second PUCCH.

The terminal may select the third PUCCH according to the priority level of the first HARQ-ACK codebook and the priority level of the second HARQ-ACK codebook, that is, the following first implementation manner. The terminal may also select the third PUCCH according to a multiplexing window of the first HARQ-ACK codebook and a multiplexing window of the second HARQ-ACK codebook, that is, the following second implementation manner. The network device may also configure a PUCCH set dedicated to multiplex transmission for the terminal, and the terminal selects the third PUCCH from this PUCCH set, that is, the following third implementation manner.

Regarding the first implementation manner, the step of selecting, by the terminal, the third PUCCH from the PUCCH set may be: the terminal selects the third PUCCH from a first PUCCH set, and the first PUCCH set is configured for uplink information with a highest or lowest priority, wherein the uplink data includes the first HARQ-ACK codebook and the second HARQ-ACK codebook.

In the case that the first PUCCH set is the PUCCH configured for the uplink information with the highest priority, wherein the uplink data includes the first HARQ-ACK codebook and the second HARQ-ACK codebook, if the priority of the first HARQ-ACK codebook is higher than the priority of the second HARQ-ACK codebook, the first PUCCH set is the PUCCH configured for the first HARQ-ACK codebook. If the priority of the first HARQ-ACK codebook is lower than the priority of the second HARQ-ACK codebook, the first PUCCH set is the PUCCH set configured for the second HARQ-ACK codebook.

In the case that the first PUCCH set is the PUCCH configured for the uplink information with the lowest priority, wherein the uplink data includes the first HARQ-ACK codebook and the second HARQ-ACK codebook, if the priority of the first HARQ-ACK codebook is higher than the priority of the second HARQ-ACK codebook, the first PUCCH set is the PUCCH configured for the second HARQ-ACK codebook. If the priority of the first HARQ-ACK codebook is lower than the priority of the second HARQ-ACK codebook, the first PUCCH set is the PUCCH set configured for the first HARQ-ACK codebook.

For instance, the terminal selects the third PUCCH from the first PUCCH set configured for the high-priority HARQ-ACK codebook according to the DCI instruction corresponding to the high-priority HARQ-ACK codebook, the CCE index, and/or the multiplexed UCI load. Taking the sub-slot HARQ-ACK codebook as high priority as an example, the terminal determines the third PUCCH from the first PUCCH set configured for the sub-slot HARQ-ACK codebook according to the DCI instruction corresponding to the high-priority HARQ-ACK codebook, the CCE index, and/or the multiplexed UCI load.

In the embodiments of the present application, when a first target HARQ-ACK codebook is the uplink information with the highest priority, the reliability of transmission of the high-priority HARQ-ACK may be ensured and the latency may be reduced.

Regarding the second implementation manner, the step of selecting, by the terminal, the third PUCCH from the PUCCH set may be: the terminal selects the third PUCCH from a second PUCCH set, and the second PUCCH set is configured for uplink data occupying a minimum or maximum PUCCH video resource in the first HARQ-ACK codebook and the second HARQ-ACK codebook. Herein, a PUCCH time frequency resource occupied by the first HARQ-ACK codebook is the multiplexing window of the first HARQ-ACK codebook. A PUCCH time frequency resource occupied by the second HARQ-ACK codebook is the multiplexing window of the second HARQ-ACK codebook. That is, the second PUCCH set is the PUCCH set configured for the HARQ-ACK codebook with the minimum or maximum multiplexing window in the first HARQ-ACK codebook multiplexing window and the second HARQ-ACK codebook multiplexing window.

For instance, when the first HARQ-ACK codebook is the sub-slot HARQ-ACK codebook and the second HARQ-ACK codebook is the slot HARQ-ACK codebook, it is determined that the first HARQ-ACK codebook multiplexing window is the minimum, and the second HARQ-ACK codebook multiplexing window is the maximum. When the first HARQ-ACK codebook is the slot HARQ-ACK codebook and the second HARQ-ACK codebook is the sub-slot HARQ-ACK codebook, it is determined that the second HARQ-ACK codebook multiplexing window is the minimum, and the first HARQ-ACK codebook multiplexing window is the maximum.

For instance, the terminal determines the third PUCCH from the second PUCCH set configured for the HARQ-ACK codebook with the minimum multiplexing window according to the DCI instruction corresponding to the HARQ-ACK codebook with the minimum multiplexing window, the CCE index, and/or the multiplexed UCI load. In this case, the terminal determines the third PUCCH from the second PUCCH set configured for the sub-slot HARQ-ACK codebook according to the DCI instruction corresponding to the sub-slot HARQ-ACK codebook, the CCE index, and/or the multiplexed UCI load, and transmission is performed in the current sub-slot.

In the embodiments of the present application, the terminal selects the third PUCCH according to the multiplexing window of the first HARQ-ACK codebook and the multiplexing window of the second HARQ-ACK codebook, and in this way, a capacity of PUCCH resources used for HARQ-ACK transmission.

Regarding the third implementation manner, the step of selecting, by the terminal, the third PUCCH from the PUCCH set may be: the terminal selects the third PUCCH from a third PUCCH set, and the third PUCCH set is configured for the terminal by the network device for simultaneous transmission of a plurality of uplink information. That is, the third PUCCH set is the PUCCH set dedicated to multiplex transmission for the terminal by the network device.

In the embodiments of the present application, the network device configures the third PUCCH set dedicated to multiplex transmission for the terminal. When the terminal needs to perform multiplex transmission, a third PUCCH resource is directly selected from the third PUCCH set, and efficiency is thereby improved.

Note that in the embodiments of the present application, the terminal is configured with these three rules, and according to these three rules, the third PUCCH resource is selected, so latency is thereby decreased, and efficiency is improved.

Note that in an embodiment, if the first PUCCH and the second PUCCH to be transmitted overlap in the time domain, it may be determined first whether the first PUCCH and the second PUCCH satisfy the multiplexing conditions. If the first PUCCH and the second PUCCH satisfy the multiplexing conditions, "the terminal selects the third PUCCH from the PUCCH set" in step 303 is performed. If the first PUCCH and the second PUCCH do not satisfy the multiplexing conditions, one of the first PUCCH and the second PUCCH is selected and transmitted.

In another embodiment, if the first PUCCH and the second PUCCH to be transmitted overlap in the time domain, determination of satisfaction of the multiplexing conditions may not have to be made, and "the terminal selects the third PUCCH from the PUCCH set" in step 303 is directly performed.

In step 304, the terminal transmits the first HARQ-ACK codebook and the second HARQ-ACK codebook in the third PUCCH.

The terminal re-encodes the first HARQ-ACK codebook and the second HARQ-ACK codebook, obtains a third HARQ-ACK codebook, and transmits the third HARQ-ACK codebook in the third PUCCH.

In step 305, the terminal transmits the first HARQ-ACK codebook and the second HARQ-ACK codebook to the network device by means of the third PUCCH.

The terminal transmits the first HARQ-ACK codebook and the second HARQ-ACK codebook to the network device by means of the third PUCCH in a sub-slot where the first PUCCH is located, and the first HARQ-ACK codebook is transmitted in the sub-slot of the first PUCCH. That is, the multiplexing window of the first HARQ-ACK codebook is a sub-slot, that is, the first HARQ-ACK codebook may be a sub-slot HARQ-ACK codebook.

In the embodiments of the present application, if the first PUCCH and the second PUCCH overlap in the time domain, the third PUCCH is selected from the PUCCH set, the first HARQ-ACK codebook and the second HARQ-ACK codebook are transmitted in the third PUCCH, and the first uplink information and the second uplink information are transmitted to the network device by means of the third PUCCH. Since the first HARQ-ACK codebook and the second HARQ-ACK codebook are both transmitted in the third PUCCH, the first HARQ-ACK codebook and the second HARQ-ACK codebook are multiplexed. In this way, the reliability of data transmission is improved, latency is decreased, and unnecessary retransmission is avoided.

Figure 5:
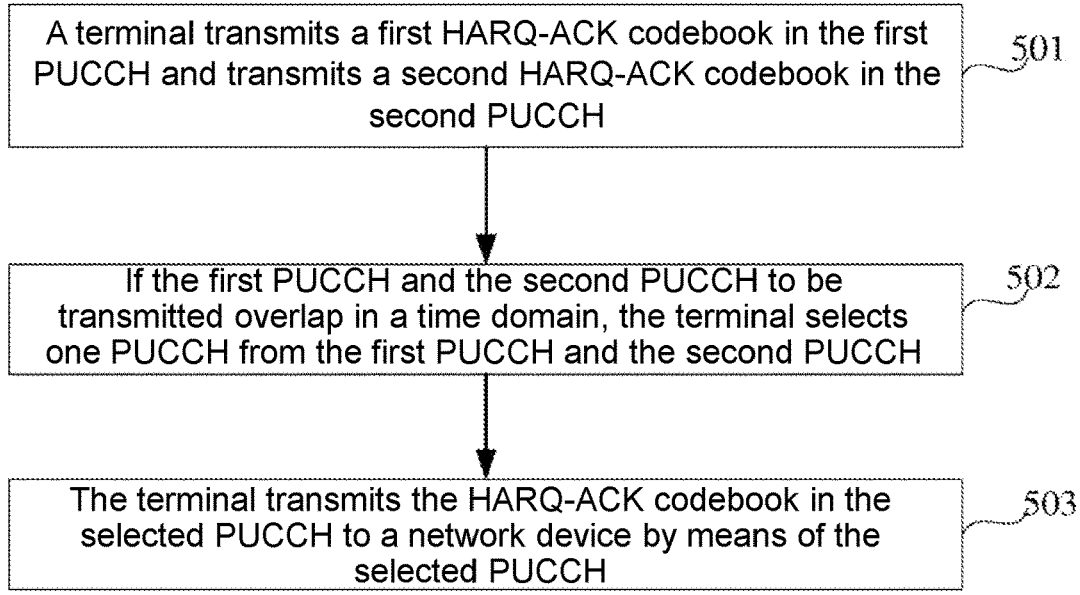
FIG. 5 is a flow chart of an uplink data transmission method provided by an exemplary embodiment of the present application.

FIG. 5 is a flow chart of an uplink data transmission method according to an exemplary embodiment of the present application. This method may be applied in the abovementioned implementation environment. In the embodiments of the present application, the first uplink information is the first HARQ-ACK codebook, and the second uplink information is the second HARQ-ACK codebook. In addition, selection and transmission of one of the first HARQ-ACK codebook and the second HARQ-ACK codebook are described as an example. The method may include the following steps so as to be implemented.

In step 501, a terminal transmits a first HARQ-ACK codebook in a first PUCCH and transmits a second HARQ-ACK codebook in a second PUCCH.

This step is identical to step 501, and description thereof is thus not repeated herein.

In step 502, if the first PUCCH and the second PUCCH to be transmitted overlap in a time domain, the terminal selects one PUCCH from the first PUCCH and the second PUCCH.

The terminal may select one PUCCH to be scheduled later from the first PUCCH and the second PUCCH, that is, the following first implementation manner. The terminal may also select one PUCCH with a small HARQ-ACK codebook window from the first PUCCH and the second PUCCH, that is, the following second implementation manner. The terminal may also select one PUCCH with an early ending time from the first PUCCH and the second PUCCH, that is, the following third implementation manner. According to the first HARQ-ACK codebook multiplexing window and the second HARQ-ACK codebook multiplexing window, the terminal may select the next PUCCH of the multiplexing window, that is, the following fourth implementation manner.

Regarding the first implementation manner, the step of selecting, by the terminal, one PUCCH from the first PUCCH and the second PUCCH may be: the terminal elects one PUCCH with a later scheduling time from the first PUCCH and the second PUCCH according to a scheduling time of the first PUCCH and a scheduling time of the second PUCCH.

For instance, if the scheduling time of the first PUCCH is later than the scheduling time of the second PUCCH, the terminal selects the first PUCCH, and if the scheduling time of the second PUCCH is later than the scheduling time of the first PUCCH, the terminal selects the second PUCCH.

In the embodiments of the present application, the terminal selects the PUCCH that is scheduled later from the first PUCCH and the second PUCCH, so that the terminal may determine the priority based on a global domain and implementation may be made through a scheduling sequence.

Regarding the second implementation manner, the step of selecting, by the terminal, one PUCCH from the first PUCCH and the second PUCCH may be: the terminal selects one PUCCH with a shortest length from the first PUCCH and the second PUCCH according to a length of the first PUCCH in a time frequency and a length of the second PUCCH in the time frequency.

For instance, in the case that the first PUCCH transmits the sub-slot HARQ-ACK codebook and the second PUCCH transmits the slot HARQ-ACK codebook, the terminal selects the first PUCCH. In the case that the first PUCCH transmits the slot HARQ-ACK codebook and the second PUCCH transmits the sub-slot HARQ-ACK codebook, the terminal selects the second PUCCH.

In the embodiments of the present application, the terminal selects the PUCCH with a small HARQ-ACK codebook window from the first PUCCH and the second PUCCH, and in this way, it is ensured that the HARQ-ACK with a short latency is transmitted first.

Regarding the third implementation manner, the step of selecting, by the terminal, one PUCCH from the first PUCCH and the second PUCCH may be: the terminal selects one PUCCH with an earlier ending time from the first PUCCH and the second PUCCH according to an ending time of the first PUCCH in the time domain and an ending time of the second PUCCH in the time domain.

For instance, if the ending time of the first PUCCH in the time domain is later than the ending time of the second PUCCH in the time domain, the terminal selects the first PUCCH, and if the ending time of the second PUCCH in the time domain is later than the ending time of the first PUCCH in the time domain, the terminal selects the second PUCCH.

In the embodiments of the present application, the terminal selects the PUCCH with an earlier ending time from the first PUCCH and the second PUCCH, and in this way, it is ensured that the HARQ-ACK with a short latency is transmitted first, and data transmission efficiency is thereby improved.

Regarding the fourth implementation manner, the step of selecting, by the terminal, one PUCCH from the first PUCCH and the second PUCCH may be: the terminal selects a PUCCH where the uplink information occupying a minimum time frequency resource is located from the first PUCCH and the second PUCCH according to a time frequency resource of the PUCCH occupied by first uplink information and a time frequency resource of the PUCCH occupied by second uplink information. Herein, the time frequency resource occupied by the first PUCCH refers to the first HARQ-ACK codebook multiplexing window, and the time frequency resource occupied by the second PUCCH refers to the second HARQ-ACK codebook multiplexing window. Correspondingly, selecting, by the terminal, a PUCCH where the uplink information occupying a minimum time frequency resource is located from the first PUCCH and the second PUCCH according to the time frequency resource of the PUCCH occupied by the first uplink information and the time frequency resource of the PUCCH occupied by the second uplink information may be: the terminal selects the PUCCH with the smallest multiplexing window from the first HARQ-ACK codebook multiplexing window and the second HARQ-ACK codebook multiplexing window according to the first HARQ-ACK codebook multiplexing window and the second HARQ-ACK codebook multiplexing window.

In step 503, the terminal transmits the HARQ-ACK codebook in the selected PUCCH to the network device by means of the selected PUCCH.

For instance, if the selected PUCCH is the first PUCCH, the terminal transmits the first uplink information to the network device by means of the first PUCCH. If the selected PUCCH is the second PUCCH, the terminal transmits the second uplink information to the network device by means of the second PUCCH.

In the embodiments of the present application, if the first PUCCH and the second PUCCH overlap in the time domain, the terminal selects and transmits one PUCCH, and resources are thereby saved in this way. Further, when the terminal selects one PUCCH, the terminal may select the PUCCH that is scheduled later from the first PUCCH and the second PUCCH, so that the priority may be determined based on the global domain and implementation may be made through the scheduling sequence. When the terminal selects one PUCCH for transmission, the terminal may also select the PUCCH with a small HARQ-ACK codebook window, select the PUCCH with an earlier ending time, or selects the PUCCH with a small multiplexing window from the first PUCCH and the second PUCCH, and in this way, it is ensured that the HARQ-ACK with a short latency is transmitted first.

Figure 6:
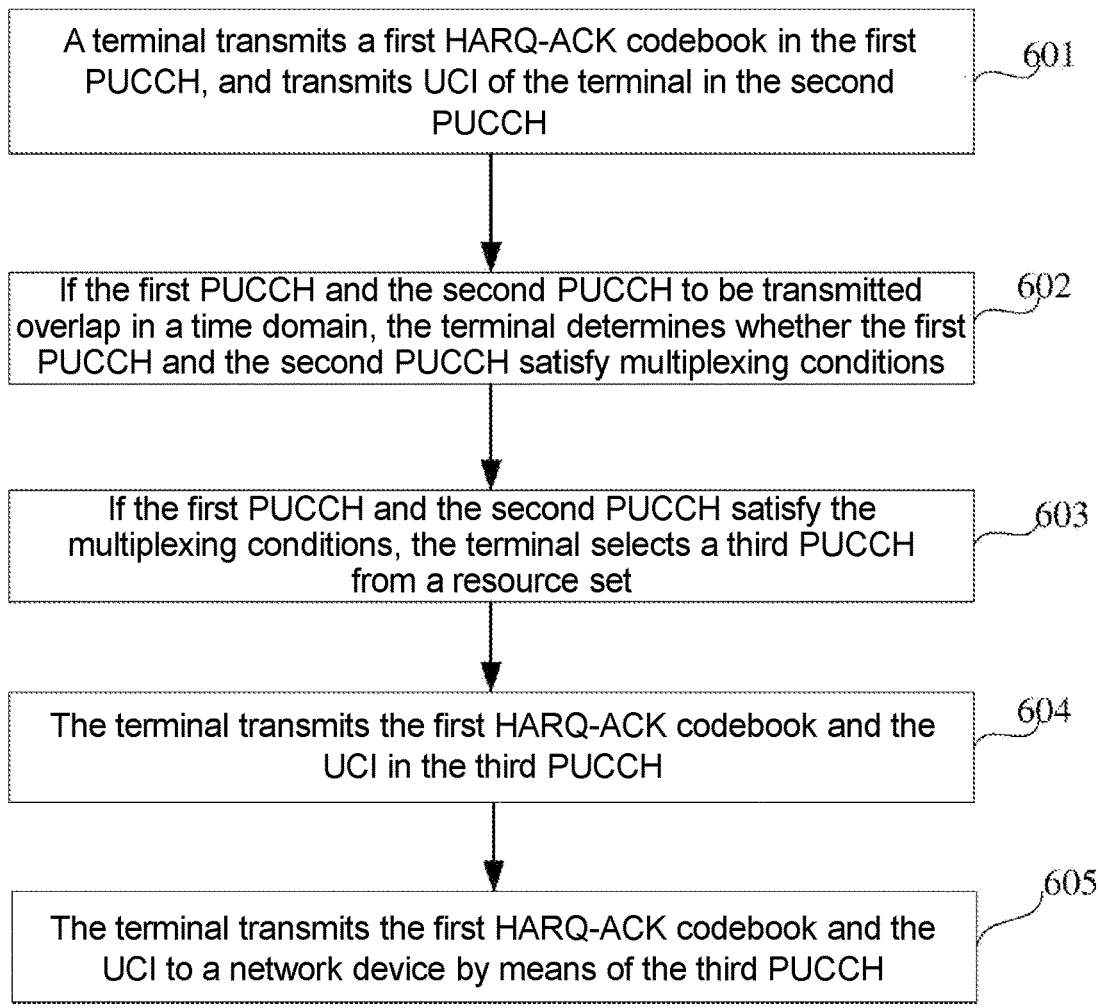
FIG. 6 is a flow chart of an uplink data transmission method provided by an exemplary embodiment of the present application.

FIG. 6 is a flow chart of an uplink data transmission method according to an exemplary embodiment of the present application. This method may be applied in the abovementioned implementation environment. In the embodiments of the present application, the first uplink information is the first HARQ-ACK codebook, and the second uplink information is the UCI of the terminal. In addition, multiplex transmission performed on the first HARQ-ACK codebook and the UCI of the terminal is described as an example. The method may include the following steps so as to be implemented.

In step 601, a terminal transmits a first HARQ-ACK codebook in a first PUCCH and transmits UCI of the terminal in a second PUCCH.

The terminal encodes the UCI and transmits the encoded UCI in the second PUCCH.

Note that the step of transmitting, by the terminal, the first HARQ-ACK codebook in the first PUCCH is identical to step 301: transmitting, by the terminal, the first HARQ-ACK codebook in the first PUCCH, so description thereof is thus not repeated herein.

In step 602, if the first PUCCH and the second PUCCH to be transmitted overlap in a time domain, the terminal determines whether the first PUCCH and the second PUCCH satisfy multiplexing conditions.

This step is identical to step 302, and description thereof is thus not repeated herein.

In step 603, if the first PUCCH and the second PUCCH satisfy the multiplexing conditions, the terminal selects a third PUCCH from a PUCCH set.

Note that the step of selecting, by the terminal, the third PUCCH from the PUCCH set and step 303: selecting, by the terminal, the third PUCCH from the PUCCH set are the same, so description thereof is not repeated herein. The third PUCCH may be different from the first PUCCH and the second PUCCH, and may also be the same as the first PUCCH or the second PUCCH.

The PUCCH set may be the PUCCH set where the first PUCCH is located, or may be the PUCCH set where the second PUCCH is located. In the embodiments of the present application, the PUCCH set being the PUCCH set where the first PUCCH is located is treated as an example for description. Correspondingly, the step of selecting the third PUCCH from the PUCCH set may be: the terminal selects the third PUCCH from the PUCCH set configured for the first HARQ-ACK codebook.

In an embodiment, when the encoding format of the first HARQ-ACK codebook is the sub-slot HARQ-ACK codebook, the first PUCCH includes a plurality of sub-slot windows. The fourth PUCCH set is configured for the sub-slot window where the first HARQ-ACK codebook is initially transmitted.

In another embodiment, when the encoding format of the first HARQ-ACK codebook is the sub-slot HARQ-ACK codebook, the first PUCCH includes a plurality of sub-slot windows. The fourth PUCCH set is the PUCCH set configured for the sub-slot window that partially overlaps the second PUCCH in the time domain in the first PUCCH.

In another embodiment, when the encoding format of the first HARQ-ACK codebook is the sub-slot HARQ-ACK codebook, the first PUCCH includes a plurality of sub-slot windows. The fourth PUCCH set is the PUCCH set where the multiplexed sub-slot window is located in the first PUCCH. Herein, the multiplexed sub-slot window is the PUCCH set where the sub-slot window carrying UCI is located in the first PUCCH, the second PUCCH, or the second PUCCH.

In the embodiments of the present application, the PUCCH set being the PUCCH set configured for the UCI is treated as an example for description. Correspondingly, the step of selecting the third PUCCH from the PUCCH set may be: the terminal selects the third PUCCH from the PUCCH set configured for the UCI.

In the embodiments of the present application, the network device may also specifically configure a PUCCH set for multiplex transmission for the terminal. Correspondingly, the step of selecting the third PUCCH from the PUCCH set may be: the terminal selects the third PUCCH from the PUCCH set configured by the network device for simultaneous transmission of a plurality of information. That is, the sixth PUCCH set is the PUCCH set dedicated to multiplex transmission for the network device.

Note that in the embodiments of the present application, the terminal is configured with these three rules, and according to these three rules, the third PUCCH resource is selected, so latency is thereby decreased, and efficiency is improved.

In step 604, the terminal transmits the first HARQ-ACK codebook and the UCI in the third PUCCH.

This step is similar to step 302, and description thereof is thus not repeated herein.

In step 605, the terminal transmits the first HARQ-ACK codebook and the UCI to the network device by means of the third PUCCH.

This step is identical to step 303, and description thereof is thus not repeated herein.

In the embodiments of the present application, if the first PUCCH and the second PUCCH overlap in the time domain, the third PUCCH is selected from the PUCCH set, the first HARQ-ACK codebook and UCI are transmitted in the third PUCCH, and the first uplink information and the UCI are transmitted to the network device by means of the third PUCCH. Since the first HARQ-ACK codebook and the UCI are both transmitted in the third PUCCH, the first HARQ-ACK codebook and the UCI are multiplexed. In this way, the reliability of data transmission is improved, latency is decreased, and unnecessary retransmission is avoided.

Figure 7:
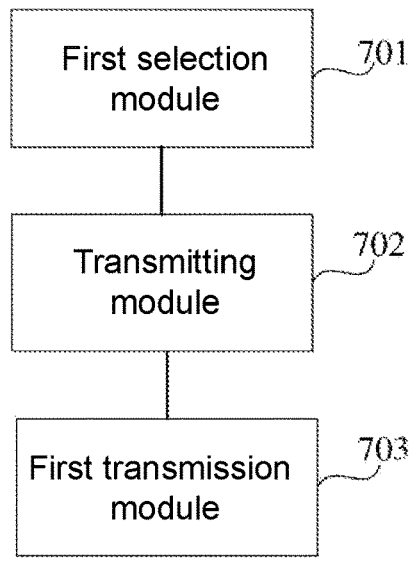
FIG. 7 is a schematic structural diagram of a data transmission apparatus provided by an exemplary embodiment of the present application.

FIG. 7 is a schematic structural diagram of an uplink data transmission apparatus according to an exemplary embodiment, and the apparatus includes a first selection module 701, a transmitting module 702, and a first transmission module 703

The first selection module 701 is configured for selecting a third physical uplink control channel (PUCCH) from a PUCCH set if a first PUCCH and a second PUCCH to be transmitted overlap in a time domain.

The transmitting module 702 is configured for transmitting first uplink information in the first PUCCH and second uplink information in the second PUCCH in the third PUCCH.

The first transmission module 703 is configured for transmitting the first uplink information and the second uplink information to a network device by means of the third PUCCH.

In an embodiment, the first uplink information is a first hybrid automatic repeat request feedback codebook (HARQ-ACK codebook), and the second uplink information is a second HARQ-ACK codebook.

The first selection module 701 is further configured for selecting the third PUCCH from a first PUCCH set, and the first PUCCH set is configured for uplink information with a highest or lowest priority between the first uplink information and the second uplink information.

The first selection module 701 is further configured for selecting the third PUCCH from the PUCCH set configured for uplink information occupying a minimum or maximum PUCCH time domain resource, wherein the uplink information includes the first uplink information and the second uplink information.

The first selection module 701 is further configured for selecting the third PUCCH from the PUCCH set configured by the network device for simultaneous transmission of a plurality of uplink information.

In another embodiment, the first selection module 701 may select the third PUCCH from the PUCCH set according to at least one of following information.

Herein, the following information includes instruction information of the network device and a sum of amount of data, and the sum of amount of data is a sum of an amount of data of the first uplink information and an amount of data of the second uplink information.

In another embodiment, the first uplink information is a first HARQ-ACK codebook, the second uplink information is UCI other than HARQ-ACK. The HARQ-ACK at least includes first HARQ-ACK, and the first HARQ-ACK is HARQ-ACKI encoded in the first HARQ-ACK codebook.

The first selection module 701 is further configured for selecting the third PUCCH from the PUCCH set configured for the first HARQ-ACK codebook.

Alternatively, the first selection module 701 is further configured for selecting the third PUCCH from the PUCCH set configured for the UCI.

Alternatively, the first selection module 701 is further configured for selecting the third PUCCH from the PUCCH set configured by the network device for simultaneous transmission of a plurality of uplink information.

In another embodiment, the first transmission module 703 is further configured for transmitting the first uplink information and the second uplink information to the network device by means of the third PUCCH in a sub-slot where the first PUCCH is located, and the first HARQ-ACK codebook is transmitted in the sub-slot of the first PUCCH.

In another embodiment, the transmitting module 702 is further configured for transmitting the first uplink information in the first PUCCH and the second uplink information in the second PUCCH in the third PUCCH if a priority of the first uplink information and a priority of the second uplink information are the same.

Alternatively, the transmitting module 702 is further configured for transmitting the first uplink information in the first PUCCH and the second uplink information in the second PUCCH in the third PUCCH if the priority of the first uplink information and the priority of the second uplink information are different.

In another embodiment, the transmitting module 702 is further configured for transmitting the first uplink information in the first PUCCH and the second uplink information in the second PUCCH in the third PUCCH if a distance between the first PUCCH and a downlink channel in the time domain satisfies a processing time requirement of the terminal and a distance between the second PUCCH and the downlink channel in the time domain satisfies a processing time requirement of the terminal.

In another embodiment, the transmitting module 702 is further configured for transmitting the first uplink information in the first PUCCH and the second uplink information in the second PUCCH in the third PUCCH if a distance between the third PUCCH and a downlink channel in the time domain satisfies a processing time requirement of the terminal.

Note that the first selection module 701 and the transmitting module 702 may be implemented by a processor, and the first transmission module 703 may be implemented by a transceiver, that is, by a receiver and a transmitter.

In the embodiments of the present application, if the first PUCCH and the second PUCCH overlap in the time domain, the third PUCCH is selected from the PUCCH set, the first uplink transmission data and the second uplink transmission data are transmitted in the third PUCCH, and the first uplink information and the second uplink information are transmitted to the network device by means of the third PUCCH. Since both the first uplink transmission data and second uplink transmission data are transmitted in the third PUCCH, the uplink transmission data and the second uplink transmission data are subjected to multiplex transmission, and the reliability of data transmission is thereby improved, latency is reduced, and unnecessary retransmission is avoided.

Figure 8:
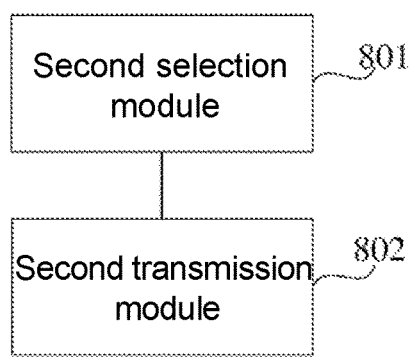
FIG. 8 is a schematic structural diagram of a data transmission apparatus provided by an exemplary embodiment of the present application.

FIG. 8 is a schematic structural diagram of an uplink data transmission apparatus according to an exemplary embodiment, and the apparatus includes a second selection module 801 and a second transmission module 802.

The second selection module 801 is configured for selecting one PUCCH from a first PUCCH and a second PUCCH if the first PUCCH and the second PUCCH to be transmitted overlap in a time domain.

The second transmission module 802 is configured for transmitting uplink information in the selected PUCCH to a network device by means of the selected PUCCH.

In an embodiment, the second selection module 801 is further configured for selecting one PUCCH with a later scheduling time from the first PUCCH and the second PUCCH according to a scheduling time of the first PUCCH and a scheduling time of the second PUCCH.

The second selection module 801 is further configured for selecting one PUCCH with a shortest length from the first PUCCH and the second PUCCH according to a length of the first PUCCH in a time frequency and a length of the second PUCCH in the time frequency.

The second selection module 801 is further configured for selecting one PUCCH with an earlier ending time from the first PUCCH and the second PUCCH according to an ending time of the first PUCCH in the time domain and an ending time of the second PUCCH in the time domain.

Alternatively, the second selection module 801 is further configured for selecting a PUCCH where the uplink information occupying a minimum time frequency resource is located from the first PUCCH and the second PUCCH according to a time frequency resource of the PUCCH occupied by first uplink information and a time frequency resource of the PUCCH occupied by second uplink information.

Note that the second selection module 801 may be implemented by a processor, and the second transmission module 802 may be implemented by a transceiver, that is, by a receiver and a transmitter.

In the embodiments of the present application, if the first PUCCH and the second PUCCH overlap in the time domain, the terminal selects and transmits one PUCCH, and resources are thereby saved in this way. Further, when the terminal selects one PUCCH, the terminal may select the PUCCH that is scheduled later from the first PUCCH and the second PUCCH, so that the priority may be determined based on the global domain and implementation may be made through the scheduling sequence. When the terminal selects one PUCCH for transmission, the terminal may also select the PUCCH with a small HARQ-ACK codebook window, select the PUCCH with an earlier ending time, or selects the PUCCH with a small multiplexing window from the first PUCCH and the second PUCCH, and in this way, it is ensured that the HARQ-ACK with a short latency is transmitted first.

Figure 9:
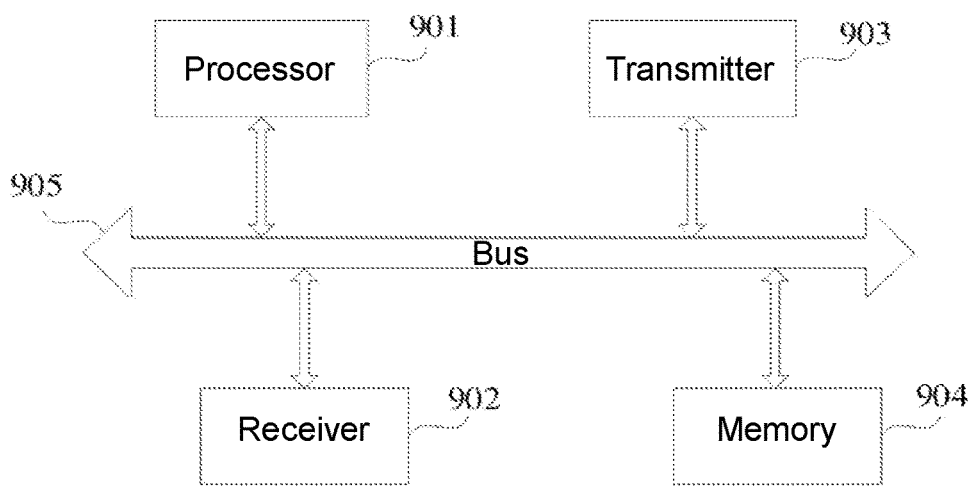
FIG. 9 is a schematic structural diagram of a device provided by an exemplary embodiment of the present application.

FIG. 9 is a schematic structural diagram of a terminal according to an exemplary embodiment. The terminal includes a processor 801, a receiver 902, a transmitter 903, a memory 904, and a bus 905.

The processor 901 includes one or more processing cores, and the processor 901 executes various functional applications and information processing by running software programs and modules.

The receiver 902 and the transmitter 903 may be implemented as a communication component, and the communication component may be a communication chip.

The memory 904 is connected to the processor 901 through the bus 905.

The memory 904 may be used to store at least one instruction, and the processor 901 is used to execute the at least one instruction to implement each step in executed by the terminal in the foregoing method embodiments.

In addition, the memory 904 may be implemented by any type of volatile or non-volatile storage device or a combination thereof, and the volatile or non-volatile storage device includes but not limited to a magnetic disk or an optical disk, an electrically erasable programmable read-only memory (EEPROM), an erasable programmable read-only memory (EPROM), a static random access memory (SRAM), a read-only memory (ROM), a magnetic memory, a flash memory, and a programmable read-only memory (PROM).

The present application provides a computer readable storage medium, the computer readable storage medium stores at least one instruction, and the at least one instruction is loaded and executed by the processor to implement the uplink data transmission method provided in the method embodiments.

The present application further provides a computer program product, and when the computer program product runs on a computer, the computer is enabled to execute the uplink data transmission method provided in the method embodiments.

A person of ordinary skill in the art can understand that all or part of the steps in the foregoing embodiments may be completed by hardware or may be completed by a program instructing related hardware. The program may be stored in a computer-readable storage medium, and the storage medium may be a read-only memory, a magnetic disk, or an optical disk.

The above description is only optional embodiments of the present application and is not intended to limit the present application. Any modifications, equivalent replacements, and modifications made without departing from the spirit and principles of the present application should fall within the protection scope of the present application.

What is claimed is:

1. An uplink data transmission method, comprising:
   selecting a third physical uplink control channel (PUCCH) from a PUCCH set if a first PUCCH to be transmitted and a second PUCCH to be transmitted overlap in a time domain;
   transmitting first uplink information in the first PUCCH and second uplink information in the second PUCCH in the third PUCCH;
   wherein the PUCCH set is configured for the first uplink information, a priority of the first uplink information is high and a priority of the second uplink information is low,
   wherein the first uplink information is a first hybrid automatic repeat reQuest feedback codebook (HARQ-ACK codebook), and the second uplink information is a second HARQ-ACK codebook, and
   wherein the third PUCCH is selected from the PUCCH set according to downlink control information (DCI) instruction corresponding to the first HARQ-ACK codebook, a control channel element (CCE) index, and a sum of amount of data, the sum of amount of data being a sum of an amount of data of the first HARQ-ACK codebook and an amount of data of the second HARQ-ACK codebook.

2. The method according to claim 1, wherein transmitting the first uplink information in the first PUCCH and the second uplink information in the second PUCCH in the third PUCCH comprises:
   transmitting the first uplink information and the second uplink information to a network device by means of the third PUCCH in a sub-slot where the first PUCCH is located, wherein the first HARQ-ACK codebook is transmitted in the sub-slot of the first PUCCH.

3. The method according to claim 1, wherein transmitting the first uplink information in the first PUCCH and the second uplink information in the second PUCCH in the third PUCCH comprises:
   transmitting the first uplink information in the first PUCCH and the second uplink information in the second PUCCH in the third PUCCH if the priority of the first uplink information and the priority of the second uplink information are different.

4. The method according to claim 3, wherein transmitting the first uplink information in the first PUCCH and the second uplink information in the second PUCCH in the third PUCCH comprises:
   transmitting the first uplink information in the first PUCCH and the second uplink information in the second PUCCH in the third PUCCH if a distance between the first PUCCH and a downlink channel in the time domain satisfies a processing time requirement of a terminal and a distance between the second PUCCH and the downlink channel in the time domain satisfies a processing time requirement of the terminal.

5. The method according to claim 3, wherein transmitting the first uplink information in the first PUCCH and the second uplink information in the second PUCCH in the third PUCCH comprises:
   transmitting the first uplink information in the first PUCCH and the second uplink information in the second PUCCH in the third PUCCH if a distance between the third PUCCH and a downlink channel in the time domain satisfies a processing time requirement of a terminal.

6. An uplink data transmission apparatus, comprising:
   a processor;
   a transmitter;
   a memory for storing at least one instruction that, when executed by the processor, causes the apparatus to:
   select a third physical uplink control channel (PUCCH) from a PUCCH set if a first PUCCH to be transmitted and a second PUCCH to be transmitted overlap in a time domain; and
   transmit first uplink information in the first PUCCH and second uplink information in the second PUCCH in the third PUCCH through the transmitter;
   wherein the PUCCH set is configured for the first uplink information, a priority of the first uplink information is high and a priority of the second uplink information is low,
   wherein the first uplink information is a first hybrid automatic repeat request feedback codebook (HARQ-ACK codebook), and the second uplink information is a second HARQ-ACK codebook;
   wherein the processor is configured to execute the at least one instruction to cause the apparatus to select the third PUCCH from the PUCCH set according to downlink control information (DCI) instruction corresponding to the first HARQ-ACK codebook, a control channel element (CCE) index, and a sum of amount of data, the sum of amount of data being a sum of an amount of data of the first HARQ-ACK codebook and an amount of data of the second HARQ-ACK codebook.

7. The apparatus according to claim 6, wherein
   the processor is configured to execute the at least one instruction to cause the apparatus to transmit, through the transmitter, the first uplink information in the first PUCCH and the second uplink information in the second PUCCH in the third PUCCH if the priority of the first uplink information and the priority of the second uplink information are different.

8. The apparatus according to claim 7, wherein the processor is configured to execute the at least one instruction to cause the apparatus to transmit, through the transmitter, the first uplink information in the first PUCCH and the second uplink information in the second PUCCH in the third PUCCH if a distance between the first PUCCH and a downlink channel in the time domain satisfies a processing time requirement of a terminal and a distance between the second PUCCH and the downlink channel in the time domain satisfies a processing time requirement of the terminal.

9. The apparatus according to claim 7, wherein the processor is configured to execute the at least one instruction to cause the apparatus to transmit, through the transmitter, the first uplink information in the first PUCCH and the second uplink information in the second PUCCH in the third PUCCH if a distance between the third PUCCH and a downlink channel in the time domain satisfies a processing time requirement of a terminal.

10. An uplink data transmission method, comprising:
receiving first uplink information in a first PUCCH and second uplink information in a second PUCCH in a third PUCCH;
wherein the third PUCCH is selected from a PUCCH set if the first PUCCH to be transmitted and the second PUCCH to be transmitted overlap in a time domain, and wherein the PUCCH set is configured for the first uplink information, a priority of the first uplink information is high and a priority of the second uplink information is low,
wherein the first uplink information is a first hybrid automatic repeat reQuest feedback codebook (HARQ-ACK codebook), and the second uplink information is a second HARQ-ACK codebook, and
wherein the third PUCCH is selected from the PUCCH set according to downlink control information (DCI) instruction corresponding to the first HARQ-ACK codebook, a control channel element (CCE) index, and a sum of amount of data, the sum of amount of data being a sum of an amount of data of the first HARQ-ACK codebook and an amount of data of the second HARQ-ACK codebook.

11. The method as claimed in claim 10, wherein receiving the first uplink information in the first PUCCH and the second uplink information in the second PUCCH in the third PUCCH comprises:
receiving the first uplink information in the first PUCCH and the second uplink information in the second PUCCH in the third PUCCH if the priority of the first uplink information and the priority of the second uplink information are different.

12. The method according to claim 11, wherein receiving the first uplink information in the first PUCCH and the second uplink information in the second PUCCH in the third PUCCH comprises:
receiving the first uplink information in the first PUCCH and the second uplink information in the second PUCCH in the third PUCCH if a distance between the first PUCCH and a downlink channel in the time domain satisfies a processing time requirement of a terminal and a distance between the second PUCCH and the downlink channel in the time domain satisfies a processing time requirement of the terminal.

13. The method according to claim 10, wherein receiving the first uplink information in the first PUCCH and the second uplink information in the second PUCCH in the third PUCCH comprises:
receiving the first uplink information and the second uplink information from a terminal by means of the third PUCCH in a sub-slot where the first PUCCH is located, wherein the first HARQ-ACK codebook is transmitted in the sub-slot of the first PUCCH.

14. The apparatus according to claim 6, wherein the processor is configured to execute the at least one instruction to cause the apparatus to transmit, through the transmitter, the first uplink information and the second uplink information to a network device by means of the third PUCCH in a sub-slot where the first PUCCH is located, wherein the first HARQ-ACK codebook is transmitted in the sub-slot of the first PUCCH.

15. The method according to claim 11, wherein receiving the first uplink information in the first PUCCH and the second uplink information in the second PUCCH in the third PUCCH comprises:
receiving the first uplink information in the first PUCCH and the second uplink information in the second PUCCH in the third PUCCH if a distance between the third PUCCH and a downlink channel in the time domain satisfies a processing time requirement of a terminal.

* * * * *